United States Patent
Park

(10) Patent No.: US 10,717,427 B2
(45) Date of Patent: Jul. 21, 2020

(54) HYBRID VEHICLE AND METHOD OF CONTROLLING ENGINE START

(71) Applicants: HYUNDAI MOTOR COMPANY, Seoul (KR); KIA MOTORS CORPORATION, Seoul (KR)

(72) Inventor: Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 182 days.

(21) Appl. No.: 15/835,304

(22) Filed: Dec. 7, 2017

(65) Prior Publication Data

US 2018/0297578 A1   Oct. 18, 2018

(30) Foreign Application Priority Data

Apr. 17, 2017 (KR) .................. 10-2017-0049230

(51) Int. Cl.
  *B60W 20/11* (2016.01)
  *B60W 20/40* (2016.01)
(52) U.S. Cl.
  CPC ............ *B60W 20/11* (2016.01); *B60W 20/40* (2013.01); *B60W 2520/10* (2013.01);
  (Continued)
(58) Field of Classification Search
  USPC .......................................................... 701/22
  See application file for complete search history.

(56) References Cited

U.S. PATENT DOCUMENTS 8,007,402 B2   8/2011 Tabata et al.
8,055,416 B2   11/2011 Matsubara et al.
(Continued)

FOREIGN PATENT DOCUMENTS

JP   2004248455 A   *   9/2004
JP       3622501 B2   *   2/2005
JP   2012-051564 A       3/2012
(Continued)

OTHER PUBLICATIONS

Japanese Patent Publication No. JP 3622501 B2 "Control Apparatus for a Hybrid Car", Inventors Seo, Nakabayashi, Takakura, Katsuta, published Feb. 23, 2005, English translation. (Year: 1998).*
Japanese Patent Publication No. JP 2004248455-A "Drive Control System of Hybrid Vehicle", Inventors Miki, Miyazaki, published Sep. 2, 2003, English Translation (Year: 2003).*
(Continued)

*Primary Examiner* — James M McPherson
(74) *Attorney, Agent, or Firm* — Morgan, Lewis & Bockius LLP

(57) ABSTRACT

A method of controlling a hybrid vehicle for reducing path loss of energy when recovered energy at the time of gear shifting is transmitted to a hybrid start generator includes steps of determining a currently required torque and a predicted acceleration at a near-future time, determining a predicted speed at the near-future time based on a current speed and the predicted acceleration, determining when it is determined that one of engine start and shift conditions is satisfied at a current time based on at least one of the required torque and the current speed, whether the remaining one of the engine start shift conditions is satisfied at the near-future time, and controlling an event corresponding to the satisfied condition at the current time is delayed or an event corresponding to the satisfied condition at the near-future time is advanced when the remaining one condition is satisfied.

20 Claims, 12 Drawing Sheets

(52) U.S. Cl.
CPC ..... *B60W 2540/10* (2013.01); *B60W 2540/12* (2013.01); *B60W 2540/30* (2013.01); *B60W 2556/50* (2020.02); *Y10S 903/903* (2013.01)

(56) References Cited

U.S. PATENT DOCUMENTS

| | | | |
|---|---|---|---|
| 9,031,722 | B2 | 5/2015 | Doering et al. |
| 2008/0119975 | A1* | 5/2008 | Yamazaki ................ B60K 6/48 701/22 |
| 2011/0093147 | A1* | 4/2011 | Kaltenbach ........... B60W 20/40 701/22 |
| 2011/0198140 | A1* | 8/2011 | Wallner ................ B60K 6/365 180/65.28 |
| 2015/0183424 | A1* | 7/2015 | Kim ..................... B60W 20/40 701/22 |
| 2016/0304082 | A1* | 10/2016 | Liu ..................... B60W 20/15 |

FOREIGN PATENT DOCUMENTS

| | | | |
|---|---|---|---|
| JP | 2012-176713 | A | 9/2012 |
| JP | 2012-201193 | A | 10/2012 |
| JP | 2012-201194 | A | 10/2012 |
| JP | 2014-122033 | A | 7/2014 |
| JP | 5904271 | B2 | 3/2016 |
| KR | 10-2012-0036858 | A | 4/2012 |
| KR | 10-1339264 | B1 | 12/2013 |
| KR | 10-2015-0086317 | A | 7/2015 |
| KR | 10-2017-0016706 | A | 2/2017 |
| KR | 101713752 | B1 * | 3/2017 ............. B60L 58/13 |
| WO | 2014/065302 | A1 | 5/2014 |

OTHER PUBLICATIONS

Notice of Allowance issued in corresponding Korean Application No. 10-2017-0049230, dated Feb. 13, 2019.

* cited by examiner

--RELATED ART--

--RELATED ART--

--RELATED ART--

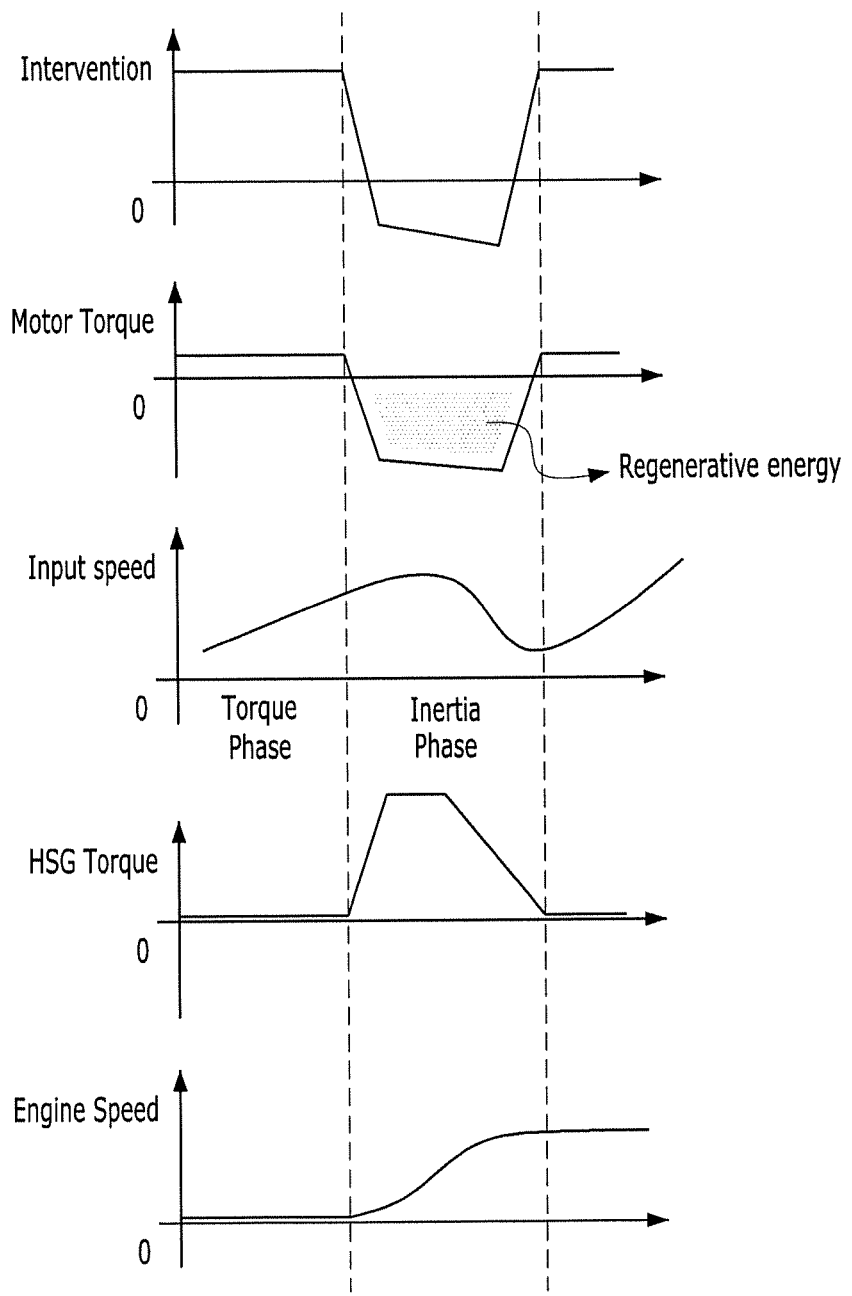

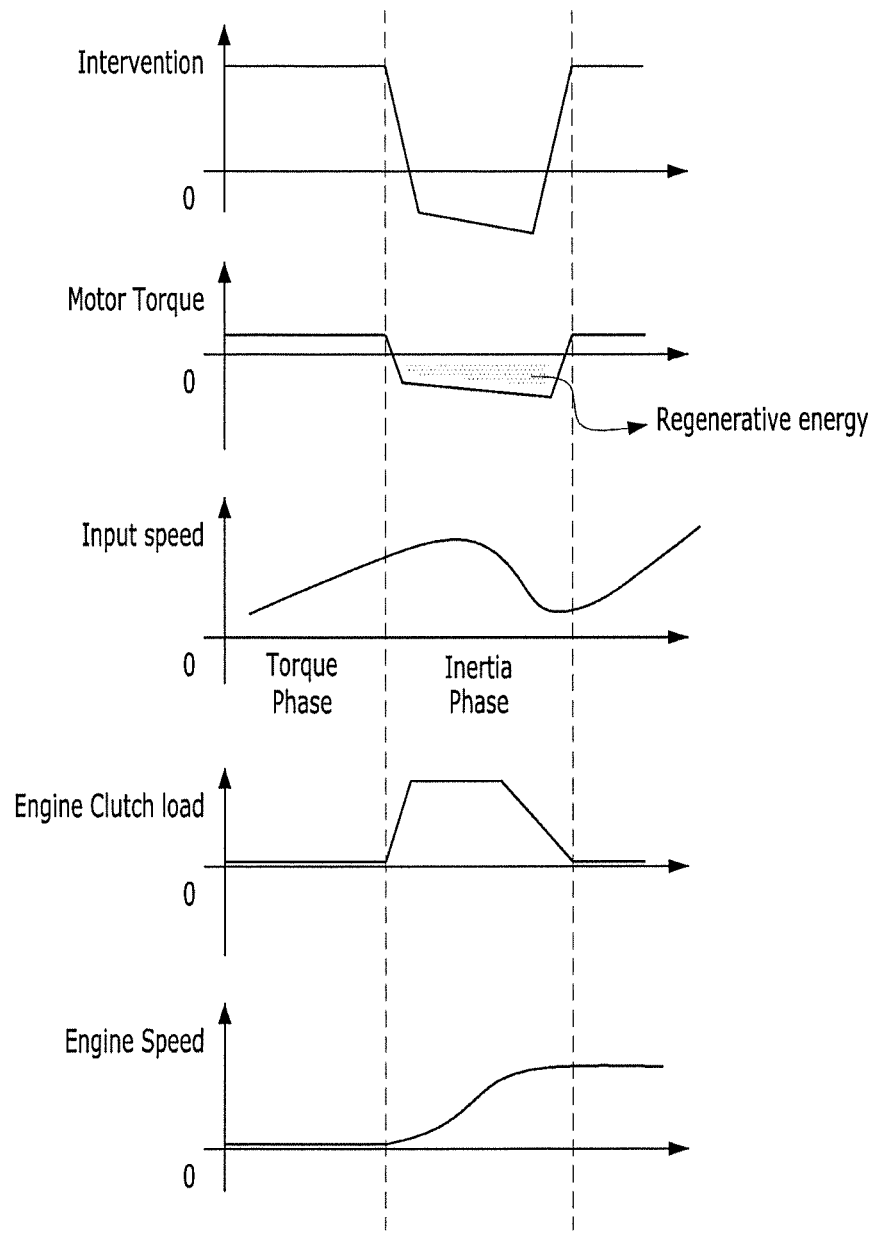

HYBRID VEHICLE AND METHOD OF CONTROLLING ENGINE START

CROSS-REFERENCE TO RELATED APPLICATION

This application is based on and claims the benefit of priority to Korean Patent Application No. 10-2017-0049230, filed on Apr. 17, 2017 with the Korean Intellectual Property Office, which is incorporated herein by reference in its entirety.

TECHNICAL FIELD

The present disclosure relates to a hybrid vehicle and an engine control method therefor, and more particularly, to a hybrid vehicle and a control method capable of using the energy of a drive shaft to be reduced in shifting for an engine start.

BACKGROUND

The statements in this section merely provide background information related to the present disclosure and may not constitute prior art.

The demand for eco-friendly vehicles is increasing due to the constant demand for fuel efficiency improvement for vehicles and the strengthening of exhaust gas regulations in many countries. As a practical alternative to engine-driven vehicles, a hybrid electric vehicle/plug-in hybrid electric vehicle (HEV/PHEV) is provided.

Such a hybrid vehicle can provide optimal output and torque depending on how well the engine and motor are operated in harmony in the course of driving with the two power sources. Particularly, in a hybrid vehicle adopting a parallel type hybrid system in which an electric motor and an engine clutch (EC) are mounted between the engine and the transmission, the output of the engine and the motor can be simultaneously transmitted to a drive shaft.

Generally, in a hybrid vehicle, electric energy is used during initial acceleration (i.e., EV mode). However, since electric energy alone has a limitation in meeting the required power from drivers, use of the engine as the main power source is eventually required (i.e., HEV mode). In such a case, in the hybrid vehicle, when the difference between the number of revolutions of the motor and the number of revolutions of the engine is within a predetermined range, the engine clutch is engaged so that the motor and the engine rotate together. Such a hybrid vehicle structure will be described with reference to FIG. 1.

FIG. 1 shows an example of a power train structure of a general hybrid vehicle.

FIG. 1 illustrates the power train of the hybrid vehicle adopting a parallel-type hybrid system in which an electric motor (or a drive motor) 40 and an engine clutch 30 are installed between an internal combustion engine (ICE) 10 and a transmission 50.

Typically, when a driver presses an accelerator (e.g., accelerating pedals) after starting the vehicle, the motor 40 is first driven using the electric power of a battery in the state in which the engine clutch 30 is opened, and wheels move by power transferred to a final drive (FD) 60 via the transmission 50 from the motor (i.e. EV mode). When a larger driving power is required due to the gradual acceleration of the vehicle, the engine 10 may be driven by operating an auxiliary motor (or a starter/generator motor) 20.

Thus, when the RPMs of the engine 10 and the motor 40 are equal to each other, the engine clutch is in an engaged state so that the vehicle is driven by both the engine 10 and the motor 40 (i.e. transition from EV mode to HEV mode). When a predetermined engine off condition, such as the deceleration of the vehicle, is satisfied, the engine clutch 30 is opened and the engine 10 is stopped (i.e. transition from HEV mode to EV mode). In this case, the battery is charged through the motor using the driving force of the wheels in the vehicle, which is referred to as braking energy regeneration or regenerative braking. Accordingly, the starter/generator motor 20 serves as a starter motor when the engine is started, and serves as a generator when the rotational energy of the engine is recovered after starting or during starting off. Therefore, the starter/generator motor 20 may be referred to as a Hybrid Start Generator (HSG).

In general, the transmission 50 uses a step-variable transmission or a multi-plate clutch such as a dual clutch transmission (DCT), and is shifted to $2^{nd}$ step in accordance with the speed and torque after starting in the $1^{st}$ step in EV mode. At this time, in order to smoothly change gears and protect the clutch in the upper shifting, the vehicle is controlled to reduce the transmission input shaft speed, such as reducing the torque of the drive source. Such control may be referred to as "intervention control".

For example, reverse torque may be applied by the electric motor 40 as the driving source torque reducing means. In this case, the electric power may be generated in the electric motor 40. This will be described with reference to FIG. 2.

FIG. 2 shows an example of an intervention process for an upper shift in a general hybrid vehicle.

Referring to FIG. 2, three graphs are shown, and the vertical axis, from top to bottom, shows the speed of the intervention, the torque of the electric motor, and the speed of the transmission input shaft, respectively.

The shifting process can be classified into a torque phase and an inertia phase. The torque phase may mean a phase in which the speed of the input shaft rises by a positive torque generated in an electric motor. The inertia phase may mean a phase at which the torque of the motor is reduced and the speed of the input shaft is reduced. Further, application of reverse (−) torque to an electric motor may mean power regeneration. Thus, the electric power generated by the electric motor can be used for charging the battery.

On the other hand, when switching from EV mode to HEV mode is determined at the acceleration in the hybrid vehicle, the engine is started. As described above, engine starting involves cranking using the power of the HSG. This will be described with reference to FIG. 3.

FIG. 3 shows an example of an engine starting process in a general hybrid vehicle.

In FIG. 3, the vertical axis of the upper graph represents the torque of the HSG, and the vertical axis of the lower graph represents the engine speed. Referring to FIG. 3, the engine is cranked by the torque generated in the HSG, and then the engine is started.

The condition for switching from EV to HEV mode is determined by various factors such as the battery's state of charge (SOC), auxiliary load, torque demand, etc. However, in the normal acceleration situation, the upper shift from the first stage to the second stage and the engine cranking occur at a similar point in time. However, in the general hybrid vehicle, as shown by the arrow in FIG. 1, the electric energy E recovered in the shifting process first charges the battery 70, and the electric power stored in the battery 70 is again supplied to the HSG 20. Therefore, only the value $\eta_{inE}$ obtained by multiplying the input efficiency factor $\eta_{in}$ ($\eta_{in<1}$) of the shift recovery energy E is stored in the battery 70. Further, when the electric power $\eta_{in}$ E stored in the battery 70 is outputted from the battery 70, it is multiplied again by the output efficiency factor $\eta_{out}$ ($\eta_{out<1}$). As a result, there is a problem that the energy E recovered at the time of shifting is transmitted to the HSG only by $E*\eta_{in}*\eta_{out}$ due to the path loss.

SUMMARY

The present disclosure is directed to a hybrid vehicle and method of controlling a mode transition that substantially obviate one or more problems due to limitations and disadvantages of the related art.

The present disclosure provides a method of using the energy recovered at the time of shifting more efficiently in engine starting, and a vehicle performing the same.

Particularly, the present disclosure provides a method and a vehicle for performing the method, which can improve the path loss of the energy recovered in gear shifting.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

The present disclosure provides a method of controlling a hybrid vehicle, the method may comprise steps of: determining, by a hybrid controller, a first torque, which is a currently required torque, determining, by the hybrid controller, a second torque to be generated at a near-future time, or a predicted acceleration at the near-future time, determining, by the hybrid controller, a predicted speed at the near-future time based on a current speed and the second torque or the predicted acceleration, determining, by the hybrid controller, when it is determined that one of an engine start condition and a shift condition is satisfied at a current time based on at least one of the first torque and the current speed, whether the remaining one of the engine start condition and the shift condition is satisfied at the near future time, and controlling, by the hybrid controller, an event corresponding to the satisfied condition at the current time is delayed or an event corresponding to the satisfied condition at the near future time is advanced when the remaining one condition is satisfied.

In another aspect of the present disclosure, a hybrid vehicle may include a driving information detection system configured to interoperate with various sensors of the hybrid vehicle and configured to detect driving information of the hybrid vehicle, a driver acceleration/deceleration prediction processor configured to generate a predicted value of a near-future acceleration/deceleration intention of a driver reflecting a driving environment of the hybrid vehicle, based on information transmitted from the driving information detection system by utilizing an acceleration/deceleration prediction model, and a hybrid controller configured to determine a first torque, which is a currently required torque, determine a second torque to be generated at a near-future time, or a predicted acceleration at the near-future time, determine a predicted speed at the near-future time based on a current speed and the second torque or the predicted acceleration, determine, when it is determined that one of an engine start condition and a shift condition is satisfied at the current time based on at least the first torque or the current speed, whether the remaining one of the engine start condition and the shift condition is satisfied at the near future time, and control an event corresponding to the satisfied condition at the current time is delayed or an event corresponding to the satisfied condition at the near future time is advanced when the remaining one condition is satisfied.

It is to be understood that both the foregoing general description and the following detailed description of the present disclosure are exemplary and explanatory and are intended to provide further explanation of the present disclosure.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 4A shows an example of a situation in which regenerated energy at the time of shifting can be directly transmitted to the starter generator motor according to one form of the present disclosure;

FIG. 4B shows an example of a situation in which kinetic energy at the time of shifting can be directly transmitted to the engine according to one form of the present disclosure;

Figure 1:
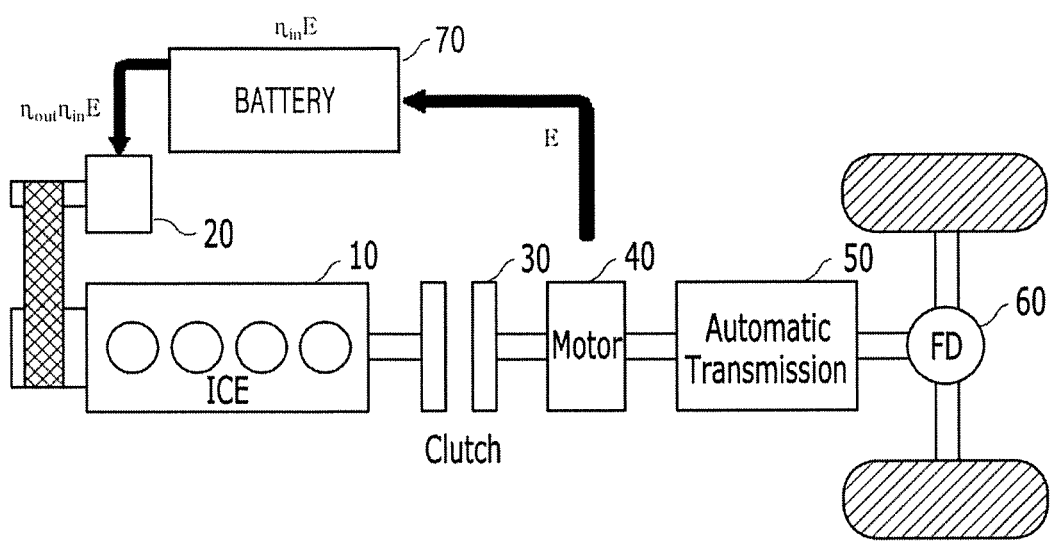
FIG. 1 shows an example of a power train structure of a general hybrid vehicle.
Figure 2:
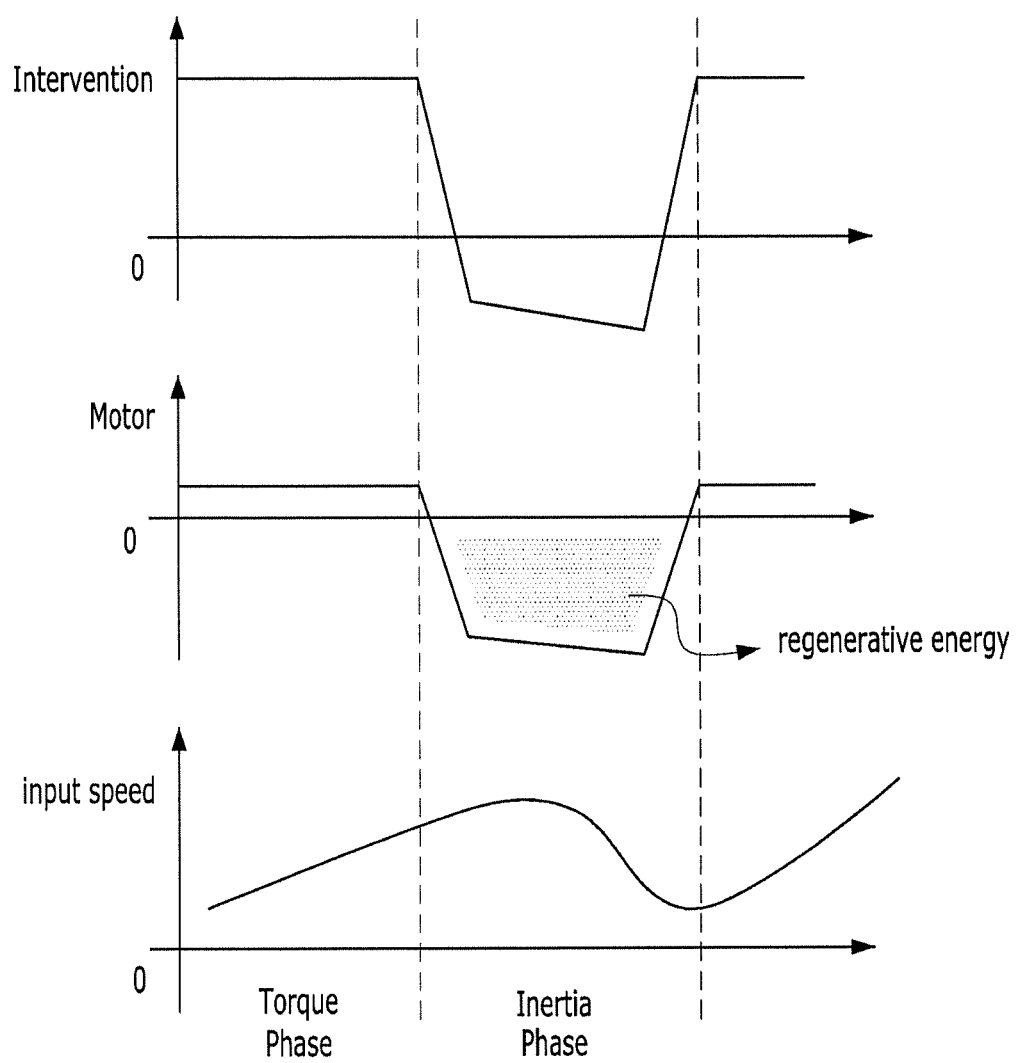
FIG. 2 shows an example of an intervention process for an upper shift in a general hybrid vehicle.
Figure 3:
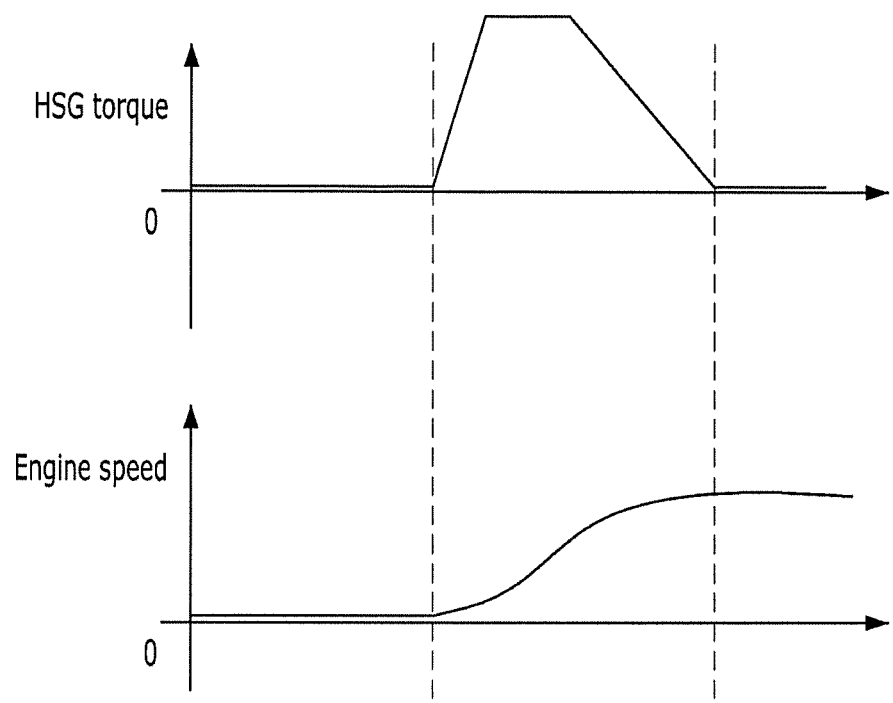
FIG. 3 shows an example of an engine starting process in a general hybrid vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure may, however, be embodied in many different forms and should not be construed as limited to the forms set forth herein. In order to clearly illustrate the present disclosure in the drawings, parts not related to the description are omitted.

Throughout the present disclosure, when a part is referred to as "including" an element, it means that the part may include other elements as well, unless specifically stated otherwise. In addition, parts denoted by the same reference numerals throughout the present disclosure denote the same components.

Also, the terms, such as 'unit' or 'module', etc., should be understood as a unit that processes at least one function or operation and that may be embodied in a hardware manner (e.g., a processor), a software manner, or a combination of the hardware manner and the software manner.

In one form of the present disclosure, there is provided a hybrid vehicle capable of reducing path loss by allowing the engine to start using at least part of kinetic energy to be recovered through intervention control during a shift, and a hybrid vehicle for performing the same. That is, according to one form, the kinetic energy of the power train system is directly supplied to the HSG without charging the battery, or the kinetic energy is directly transferred to the engine through the driving shaft.

In order for the kinetic energy to be recovered through the intervention control to be used for cranking the engine directly without passing through the battery, the shift timing and the engine start timing must be within a predetermined time range. For example, in the intervention control as shown in FIG. 4A, when the interval during which regeneration occurs due to the reverse torque applied to the motor, the inertia phase of the transmission, and the cranking interval of the HSG overlap each other on the time axis, energy recovered through the motor can be delivered directly to the HSG without passing through the battery (i.e., no charging or discharging occurs).

As another example, in the intervention control as shown in FIG. 4B, when the interval during which regeneration occurs due to the reverse torque applied to the motor and the inertia phase of the transmission overlap each other on the time axis, at least part of the kinetic energy for intervention can be directly transmitted to the engine via the engine clutch, instead of recovering all of the kinetic energy for intervention by charging the battery.

In other words, the number of revolutions of the electric motor (i.e., the number of revolutions of the transmission input shaft) can be reduced by the reverse torque (i.e., the engine clutch load) due to the engine cranking for engine starting.

To this end, the engine clutch can be controlled to be in a slip-state (i.e., the engine clutch load rising period) during the overlapping period described above. In this case, since cranking using HSG becomes unnecessary, it is not necessary that energy is transferred along an inefficient path where kinetic energy is converted into electric energy and is reconverted from HSG to kinetic energy again.

As a result, not only the electric energy consumption of the HSG for engine cranking become unnecessary, but also the interventional torque can be partly covered by the cranking torque, thereby improving the efficiency.

Of course, the graphs shown in FIGS. 4A and 4B are most ideal situations. However, as long as the interval during which regeneration occurs due to the reverse torque applied to the motor and the cranking interval of the HSG at least partly overlap each other, at least a part of the energy to be recovered in the shifting process can be directly used for the engine starting without going through the battery regardless of whether the energy recovery is started first or the engine starting is started first.

Therefore, one form of the present disclosure is not limited by the degree to which the interval of shift intervention control and the engine starting interval are overlapped with each other.

Therefore, in the present form, when the conditions for occurring one of the shift event or the engine start event are satisfied, the time when the remaining one occurs is predicted, and according to the prediction result, i.e., in a case where the time when the remaining one occurs is predicted within the preset time from the time when the former one occurs, it is proposed to delay the event in which the occurrence condition is satisfied or to advance the time-predicted event so that the intervals for the two events are at least partly overlapped in time.

Here, the engine start condition and the occurrence condition of the (upper) shift can be set to at least one of the vehicle speed, the battery charge state (i.e., SOC), the accelerator pedal position, the torque demand (i.e., required torque), or the required drive power. This will be described later in more detail.

In one form of the present disclosure, whether or not the shift occurs and whether or not the engine is started can be determined at each of the current time point and the near future time point, in order to determine the shift time point and the engine start time point.

In one form of the present disclosure, the shift time point and the engine start time point can be predicted using the near future prediction model using the machine learning technique.

In another form of the present disclosure, the shift time point and the engine start time point may be predicted by setting a prediction criterion based on at least one of time, torque, and speed through efficiency analysis according to the degree of overlapping.

First, a hybrid vehicle structure to which forms of the present disclosure may be applied will be described with reference to FIG. 5.

Figure 5:
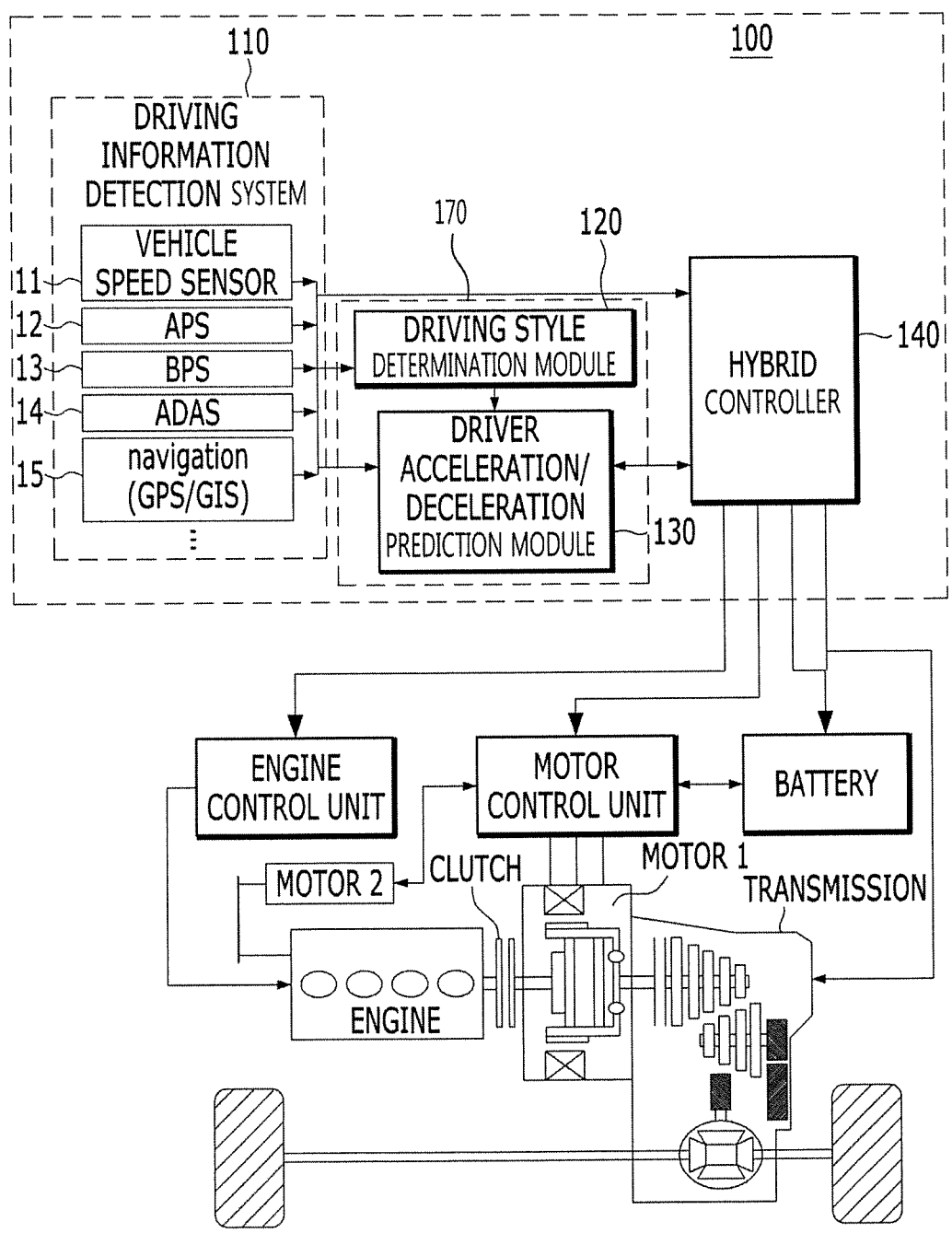
FIG. 5 is a block diagram schematically illustrating a control system of a hybrid vehicle in one form of the present disclosure.

FIG. 5 is a block diagram schematically illustrating a control system of a hybrid vehicle according to one form of the present disclosure.

Referring to FIG. 5, the control system 100 of a hybrid vehicle includes: a driving information detection system 110, a processor 170, and a hybrid controller 140. The processor 170 has an associated non-transitory memory storing software instructions which, when executed by the processor 170, provides the functionalities of a driving style determination module 120, a driver acceleration/deceleration prediction module 130. This configuration is merely illustrative, and the transmission control system may be configured to include fewer elements (e.g., omitting the driving style determination module) or more elements. According to an embodiment, the processor 170 may be included in the hybrid controller 140.

The driving information detection system 110 detects drive information according to driving of the vehicle in operative connection with at least one of a vehicle speed sensor 11, an accelerator position sensor (APS) 12, a brake pedal sensor (BPS) 13, an advanced driver assistance system (ADAS) 14, and a navigation unit 15.

The driving information detection system 110 detects the driver's accelerator operation status through the APS 12 and detects the brake operation status through the BPS 13.

The driving information detection system 110 detects the vehicle speed through the vehicle speed sensor 11 and detects front behavior information including the relative distance and acceleration with respect to a proceeding vehicle through a radar sensor, a (stereo) camera, or the like of the ADAS 14. Of course, besides the radar and camera, various sensors such as an ultrasonic sensor and laser may be utilized depending on the configuration of the ADAS.

The driving information detection system 110 detects navigation information (road environment information) such as GPS/GIS-based location information about the vehicle, road type, congestion degree, speed limit, intersection, tollgate, turn and gradient information. To provide this information, the navigation unit 15 may reference a built-in navigation map and traffic information collected through external wireless communication (e.g., telematics, TPEG, etc.).

The driving style determination module 120 of the processor 170 determines the driver's driving style based on a drive pattern such as an average velocity, an APS change amount (dAPS), and a BPS change amount (dBPS) according to the driver's manipulation of the vehicle.

For example, the driving style determination module 120 may configure a fuzzy membership function using measurement factors such as the APS change amount, the BPS change amount, the vehicle speed, the gradient, and the like detected by the driving information detection system 110 as input parameters, and calculates a short-term driving style index (SI=0 to 100%).

The driving style determination module 120 may determine the driving style of the driver at a plurality of levels by dividing the calculated short-term driving style index (SI=0 to 100%) based on a predetermined reference ratio according to the driving style intensity.

The driver acceleration/deceleration prediction module 130 of the processor 170 learns an acceleration/deceleration prediction model according to the driving style by utilizing machine learning scheme and yields a predicted value of the driver's near-future acceleration/deceleration intention reflecting the driving environment of the vehicle and the driving style by utilizing the acceleration/deceleration prediction model. That is, the driver acceleration/deceleration prediction module 130 may use the vehicle speed, the radar information, the navigation information, and the driving style of the driver detected through the driving information detection system 110 as input information to quantitatively digitize the type of driving manipulation that occurs in units of relatively short time. Thereby, the driver acceleration/deceleration prediction module 130 may determine the driver's momentary intention of acceleration/deceleration and generate a predicted value of near-future acceleration/deceleration of the driver. The predicted acceleration/deceleration value may be configured with a strength and probability of stepping on an accelerator or a brake pedal in a predetermined time unit in the near future.

A specific prediction algorithm of the acceleration/deceleration prediction module 130 may include a neural network that complements a pre-constructed prediction model using a machine learning technique, which will be described later in more detail.

The hybrid controller 140 is an electric circuitry that executes instructions of software which thereby performs various functions described hereinafter.

The hybrid controller 140 controls the operation of each part for drive mode switching of the hybrid vehicle according to one form of the present disclosure, and that integrally controls, as the highest controller, the engine controller and the motor controller connected over a network.

The hybrid controller 140 may analyze the driver's current required torque detected by the driving information detection system 110 through the APS or BPS and transmit the analyzed torque to a transmission control unit (TCU). In addition, the hybrid controller may predict a required torque at a specific time in the near future based on the received predicted near-future acceleration/deceleration value and, and transmit the predicted torque to the TCU.

The TCU may acquire information on the current required torque and the predicted near-future required torque value from the hybrid controller 140 to determine whether or not to perform gear-shift and transmit a gear-shift command corresponding to the determination result to the transmission.

In some forms, if the acceleration/deceleration prediction module 130 predicts even the near-future required torque using the predicted near-future acceleration/deceleration value, the acceleration/deceleration prediction module 130 may directly transmit the value of the near-future required torque to the TCU.

Alternatively, the TCU may determine whether or not to perform gear-shift according to the current required torque, and the hybrid controller 140 may determine whether or not to perform gear-shift based on the predicted value of the near-future required torque. The result of the determination performed by the hybrid controller 140 may be transmitted to the TCU so as to override the gear-shift determination of the TCU.

In this form, the driving style determination module may be omitted depending on the configuration. In this case, the driver acceleration/deceleration prediction module 130 may perform acceleration/deceleration prediction, excluding an input value related to the driving style.

Hereinafter, a method for the driver acceleration/deceleration prediction module 130 to predict the driver's acceleration/deceleration intention will be described with reference to FIGS. 6A and 6B.

Figure 6A:
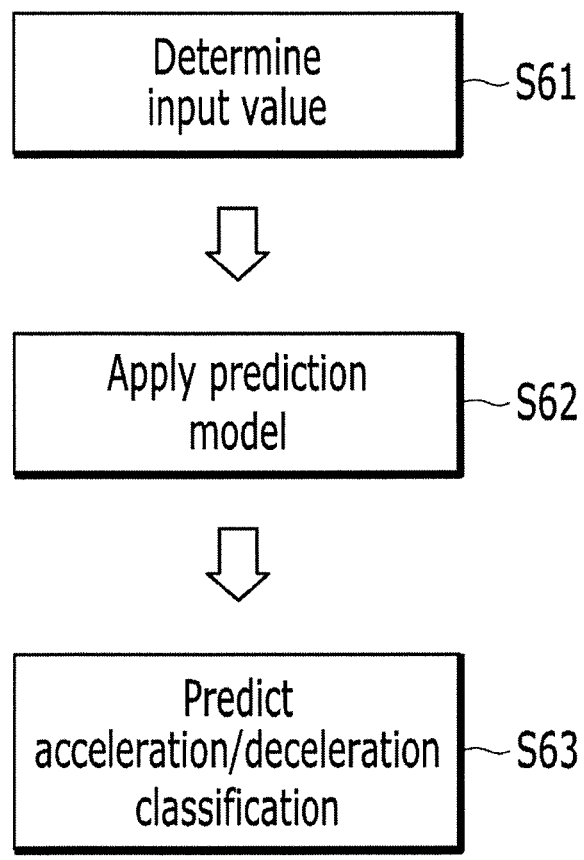
FIGS. 6A and 6B illustrate an exemplary process of predicting a driver's intention of acceleration/deceleration that may be applied to forms of the present disclosure.
Figure 6B:
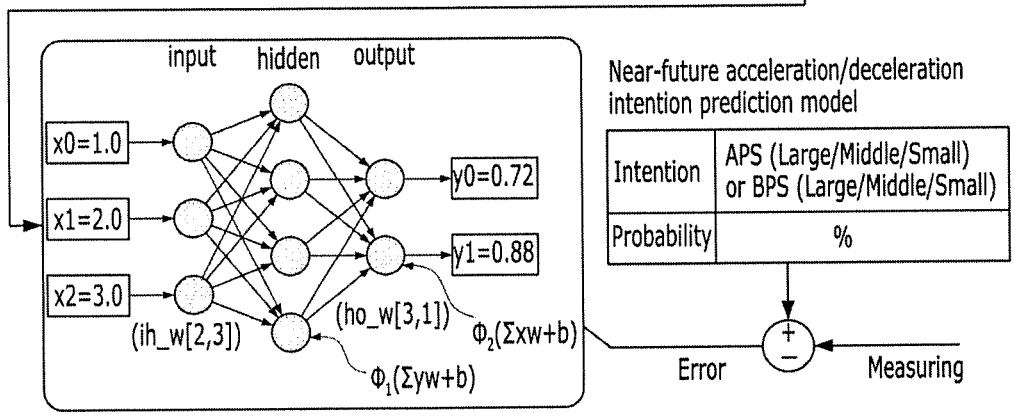

FIGS. 6A and 6B illustrate an exemplary process of predicting a driver's intention of acceleration/deceleration that may be applied to forms of the present disclosure.

Referring to FIG. 4A, the process of the driver acceleration/deceleration prediction module 130 predicting the driver's acceleration/deceleration intention may be divided into three steps. Specifically, parameters to be used as input values for prediction may be determined first (S61). The prediction model may be modified through machine learning scheme (S62), and the acceleration and deceleration may be classified through the determined input value and the modified model to calculate a predicted value for a near-future situation (S63).

Here, determining the input value (S61) may include: 1) extracting candidates of the input value; 2) pre-processing input signals by integrating the input signals; and 3) selecting a final parameter using the pre-processed candidate values. As machine learning scheme, a time series model-based technique or a deep learning-based technique may be used. Examples of the time series model-based technique may include the autoregressive integrated moving average (ARIMA) technique, which describes changes in behavior over time with a stochastic indicator, and the multi-layer perceptron (MLP) technique, which uses nonparametric regression as a universal approximator. Examples of the deep learning-based technique may include the Stacked Auto Encoder (SAE) technique, which makes input/output data similar through dimension reduction, the Recurrent Neural Networks (RNNs) technique, which is a neural network algorithm to process sequential information, and the Long Short Term Memory (LSTM) technique suitable for long-term dependency learning. An example of the driver acceleration/deceleration prediction module 130 predicting the driver's near-future acceleration/deceleration intention using the neural network algorithm is shown in FIG. 6B.

Referring to FIG. 6B, the driver acceleration/deceleration prediction module 130 according to one form of the present disclosure includes a neural network that learns an acceleration/deceleration prediction model for each driving style of the driver using a machine learning technique.

In one form, the driver acceleration/deceleration prediction module 130 has a near-future acceleration/deceleration prediction model for each driving style pre-constructed based on big data which has been accumulated through test driving by utilizing the neural network before shipment of the vehicle.

Further, the driver acceleration/deceleration prediction module 130 may reflect, in the near-future acceleration/deceleration prediction model for each driving style constructed using the neural network, the vehicle behavior data learned through actual driving of the vehicle after shipment of the vehicle, thereby generating a near-future acceleration/deceleration prediction model for each driving style personalized for the driver. At this time, the driver acceleration/deceleration prediction module 130 may apply the learned behavior data to the near-future acceleration/deceleration prediction model of the corresponding driving style according to determination of the driver's driving style (mild, general, sporty, etc.).

The driver acceleration/deceleration prediction module 130 may calculate a predicted value of the near-future acceleration/deceleration intention according to the driving style of the driver, using the driving environment that includes the vehicle speed, the radar information and the navigation information and the driving style of the driver as input information. Here, the driving style may be classified into a plurality of style types as shown in FIG. 6B, and may be configured by numerical values such as an average speed, an accelerator pedal change rate (dAPS), and a brake pedal change rate (dBPS)

In addition, the driver acceleration/deceleration prediction module 130 may perform model modification according to the driver acceleration/deceleration model learning through machine learning scheme in real time while being mounted on the vehicle, or may receive a modified model from the outside and use the same for the prediction operation without learning.

In other words, when the model is allowed to be modified from the outside, the parameters serving as input values of learning may be transmitted to a telematics center or a cloud server, such that model modification through learning is performed from the outside and only a final model is transmitted to the vehicle.

Figure 7:
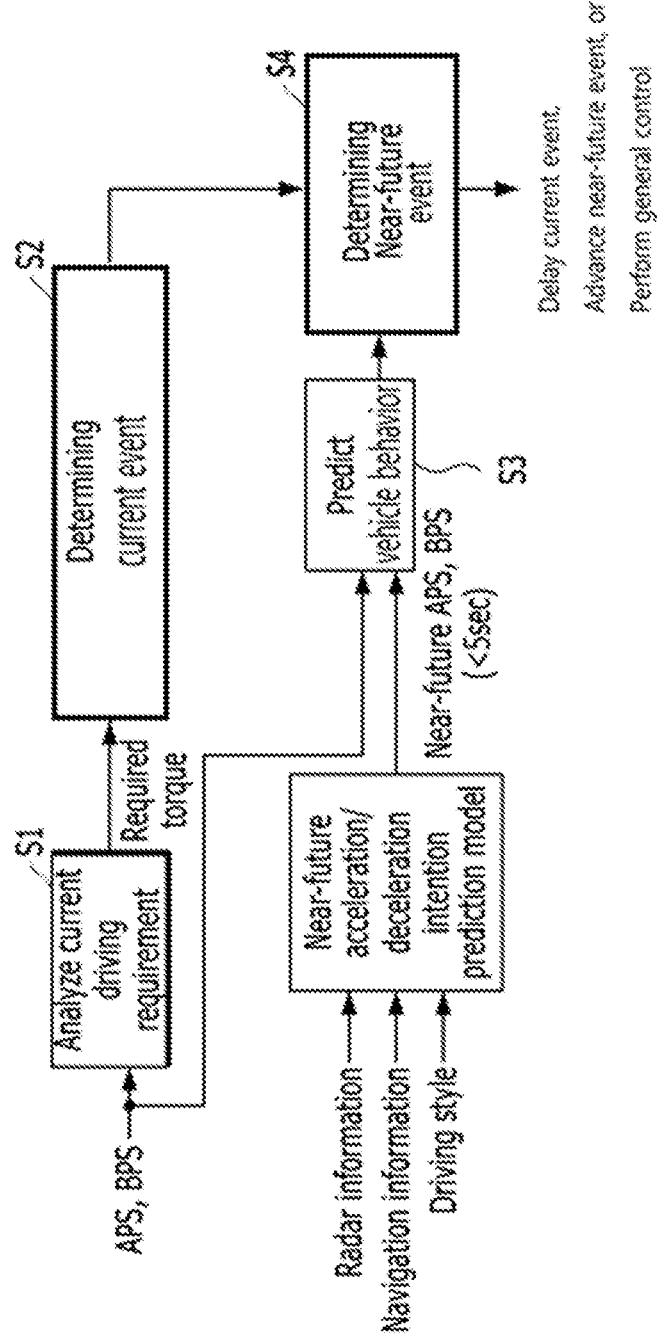
FIG. 7 illustrates a mode transition method using a near-future acceleration/deceleration prediction model according to another form of the present disclosure.

FIG. 7 illustrates a mode transition method using a near-future acceleration/deceleration prediction model according to one form of the present disclosure.

Referring to FIG. 7, the hybrid controller 140 analyzes current operation requirements according to APS or BPS due to the driver's manipulation, and calculates a required torque (S1). The hybrid controller 140 determines a current event (i.e., whether gear shift or engine start occurs or not) based on the current required torque (S2).

Meanwhile, the driver acceleration/deceleration prediction module 130 outputs the driver's acceleration/deceleration intention prediction information using the near-future acceleration/deceleration prediction model, and then the hybrid controller 140 may predict vehicle behavior in the near-future (S3).

By combining the respective determination result of the steps of S2 and S3, the hybrid controller 140 may predict an event (i.e., gear shift or engine start to be occur in the near-future (S4) and may delay the current event or advance the event to occur in the near-future (i.e., near future event). Of course, the hybrid controller 140 may perform general control in which the time control is not applied when it is determined that the overlapping of the shift timing and the engine start timing is difficult to occur over a certain range, despite the event delay/forward pull.

Here, the predicted required torque value may be calculated by the driver acceleration/deceleration prediction module 130 or may be calculated by the hybrid controller 140. Although not shown in figure, the predicted required torque value may be calculated by a separate controller for generating the predicted required torque value.

The mode transition method for the hybrid vehicle according to one form of the present disclosure will be described in more detail with reference to FIG. 8, focusing on the control system 100 of the hybrid vehicle described above.

Figure 8:
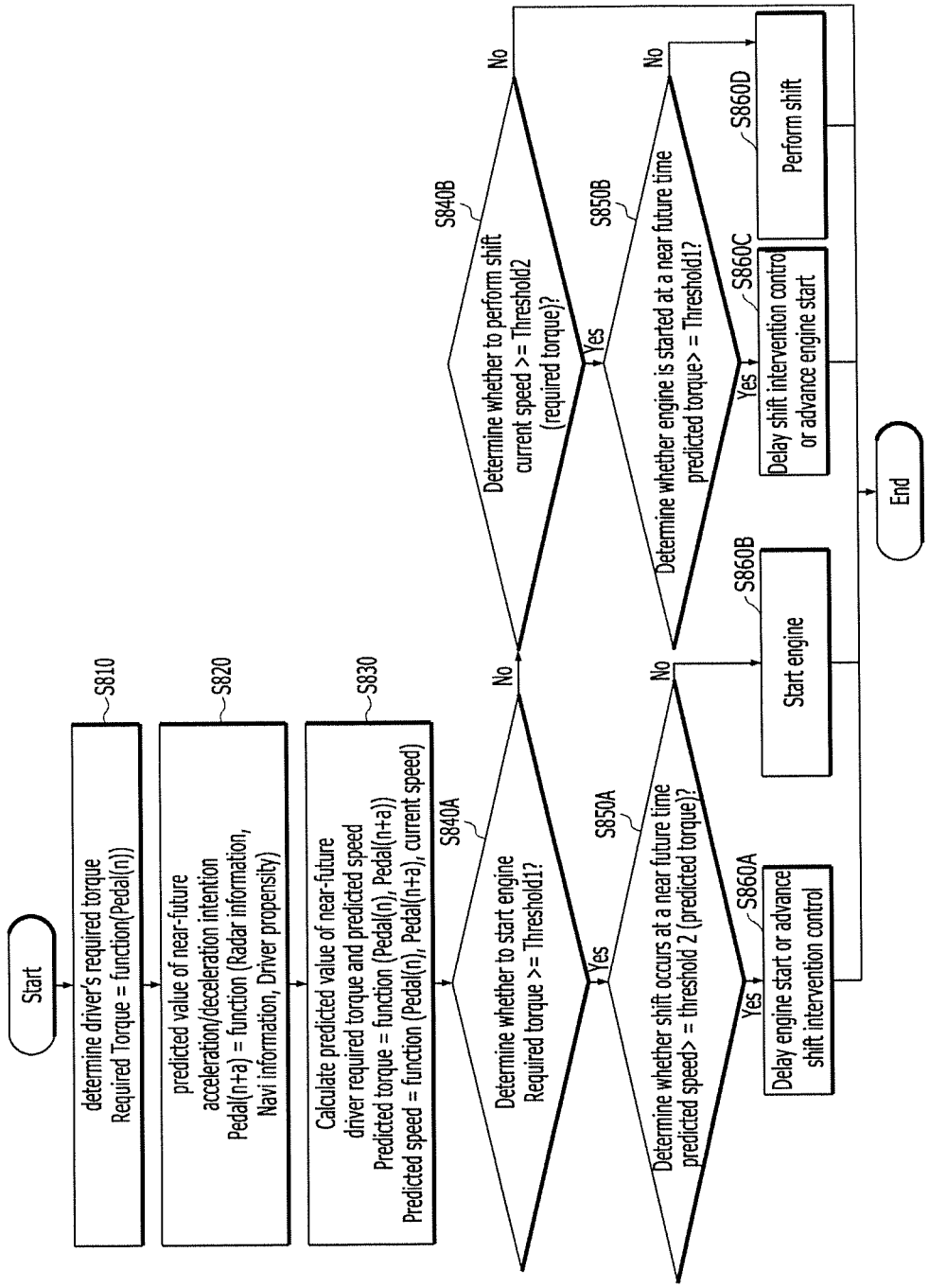
FIG. 8 is a flowchart illustrating a method of controlling a mode transition of a hybrid vehicle according to one form of the present disclosure.

FIG. 8 is a flowchart illustrating a method of controlling a mode transition of a hybrid vehicle according to one form of the present disclosure.

Referring to FIG. 8, the hybrid controller first detects the APS change amount or the BPS change amount through the driving information detection system 110, and determine the current driver required torque (S810).

Here, the required torque may be obtained from a function of the pedal position Pedal(n) sensed by the current pedal sensors APS and BPS. More specifically, '(n)' has a positive (+) value when the accelerator pedal APS is operated, and a negative (−) value when the brake pedal BPS is operated.

If the APS and the BPS are simultaneously detected due to the driver's faulty manipulation, the hybrid controller may apply the brake override function to ignore the APS change and calculate the required torque only based on the BPS change.

The driver acceleration/deceleration prediction module 130 generates a predicted value of the near-future acceleration/deceleration intention Pedal(n+a) of the driver using the vehicle speed, the radar information, the navigation information, and the driving style of the driver as input information (S820).

Here, Pedal(n+a) means the position of the acceleration/brake pedal after 'a' seconds. The value of 'a' may be a time base on which the engine start event and the shift event can be overlapped. For example, assuming that 'a' is 3 seconds, if the hybrid controller 140 determines that the time difference between the engine start time point and shift time point is within 3 seconds, it means that at least one of the events can be delayed or advanced so that the two events can be overlapped by the control of the hybrid controller 140. It is apparent to those skilled in the art that the value of 'a' can be variously set according to the vehicle specification such as the electric power generation efficiency of the electric motor, the capacity, and the operation characteristics of the starter/generator motor.

In addition, the predicted value of the near-future acceleration/deceleration intention may mean the driver's acceleration intention (APS increase or BPS decrease) or deceleration intention (APS decrease or BPS increase) predicted after a predetermined time in the near future, and the amount of change thereof or the pedal position. Of course, the information on the acceleration/deceleration intention, the amount of change, the position of the pedal, and the like may be included together with the probability information thereof.

Using the predicted value of the acceleration/deceleration intention (Pedal(n+a)) of the driver acceleration/deceleration prediction module 130, the hybrid controller 140 may predict the near-future required torque (i.e., "predicted torque") and the vehicle speed in the near-future, i.e., "predicted speed" (S830).

More specifically, the hybrid controller 140 can obtain the predicted torque as a function of the predicted value of the near-future acceleration/deceleration intention, and can calculate the predicted speed as a function of the current pedal sensor value, the predicted value of the near-future acceleration/deceleration intention, and the current speed. That is, the predicted speed can be obtained by adding the speed change amount obtained by the difference between the future pedal operation state and the current pedal operation state to the current speed sensed by the vehicle speed sensor 11.

When the current speed, the current required torque, the predicted speed, and the predicted torque are obtained, the hybrid controller 140 can determine the current event and the event to occur in the near future (i.e., near future event).

Specifically, the hybrid controller 140 determines whether or not the mode transition to the HEV mode occurs, that is, whether the engine is started (S840A), based on the current required torque or required power (required torque>=Threshold1?). Here, 'Threshold 1' may be a torque that is a reference for the engine start determined by at least one of a vehicle speed, a motor maximum torque, a battery available power, and a current SOC.

If it is determined that the engine needs to be started based on the current torque, the hybrid controller 140 determines whether a shift occurs at a near future time based on the predicted speed (predicted speed>=threshold 2 (predicted torque)?) (S850A). Here, 'Threshold 2 (predicted torque)' may mean a reference speed for the shift at which the value is changed according to the predicted torque.

As a result of the determination, the hybrid controller 140 can determine to delay the engine start within 'a' second range or to advance the shift intervention control if it is predicted that the engine start currently occurs and the shift will occur at a near future time point 'a' second later (S860A).

Conversely, if it is determined in step S850A that the engine start currently occurs but the shift does not occur 'a' second later, simply the engine may start (S860B).

If it is determined in step S840A that the engine start condition is not satisfied at the present time, the hybrid controller 140 determines whether or not a shift occurs at the present time based on the current required torque and the current speed (current speed>=Threshold2 (required torque)?) (S840B).

If a shift occurs, whether the engine is started at a near future time may be determined based on the predicted torque (predicted torque>=Threshold1?) (S850B).

As a result of the determination, the hybrid controller 140 can determine that the shift currently occurs, and if it is predicted that the engine start will occur at a near future time 'a' second later, the hybrid controller 140 can advance the engine start or delay the shift intervention control within 'a' second (S860C).

On the other hand, if it is determined in step S850B that the shift currently occurs but the engine does not start after 'a' second, the shift can be simply performed (S860B). If neither engine start nor shift occurs at the present time, the process can be repeated from the step 810.

Here, in performing the step S860A or S860C, as described above, the hybrid controller 140 may control at least a part of the kinetic energy of the drive shaft to be transmitted directly to the engine as kinetic energy, or to the HSG in the form of electric energy without charging the battery.

As described so far by referring FIG. 8, the near future required torque and speed are predicted by using the near future prediction model through the machine learning technique. According to another aspect of the present embodiment, instead of using the near future prediction model, it is possible to predict that the event will occur in the near future when the current operating point is close to the predetermined mapping line.

This will be described with reference to FIGS. 9 to 10*b*.

Figure 9:
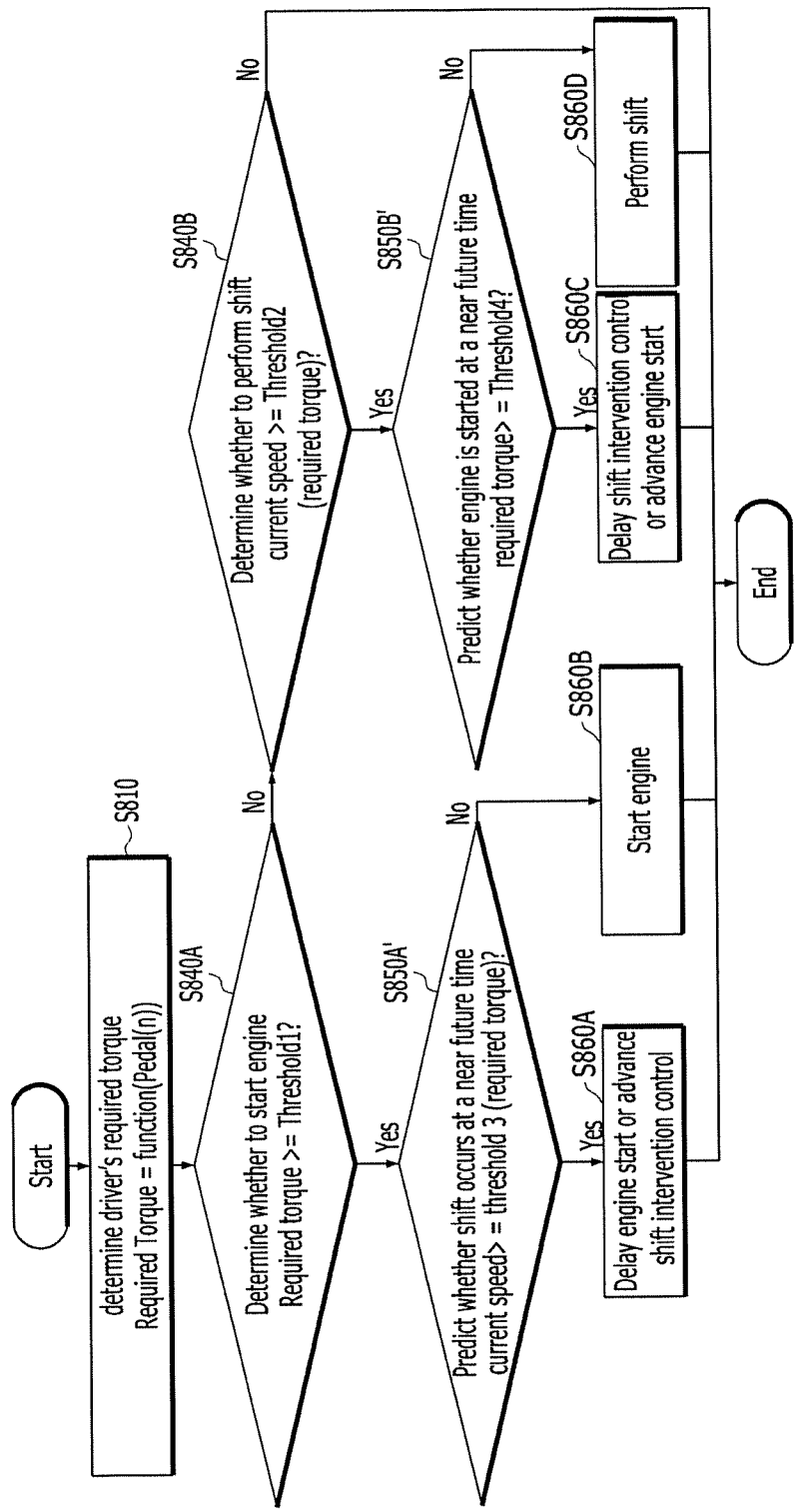
FIG. 9 is a flowchart showing an example of a control method of a hybrid vehicle according to another form of the present disclosure.
Figure 10A:
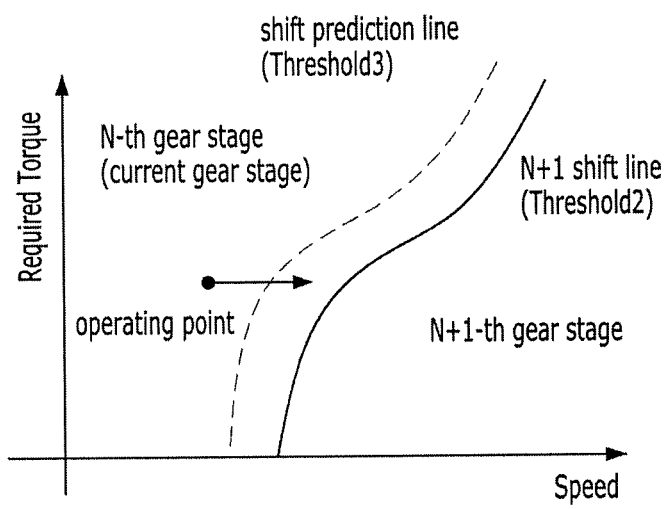
FIGS. 10A and 10B show an example of a mapping line using proximity according to another aspect of an embodiment of the present form.
Figure 10B:
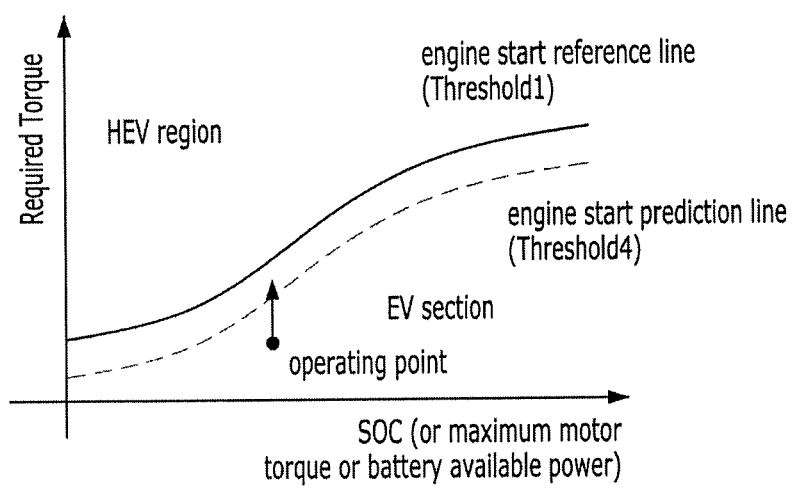

FIG. 9 is a flowchart showing an example of a control method of a hybrid vehicle according to another form of the present disclosure; and FIG. 10 shows an example of a mapping line using proximity according to another aspect of an embodiment of the present form.

In FIG. 9, only the difference from FIG. 8 will be described for simplicity of the specification.

Referring to FIG. 9, the process of predicting the future driver's acceleration/deceleration intention (S820 to S830) is omitted, and the current event determination is performed (S840A, S840B).

In case of the near future prediction, it is possible to predict whether or not the shift occurs in the near future (S850A') based on the mapping line for the current torque and the shift (current speed>=Threshold3 (required torque)?), if engine start is required in step S840A. The mapping line for the shift will be described with reference to FIG. 10A. Referring to 10A, a mapping line (i.e., 'shift prediction line', corresponding to Threshold 3) having a vehicle speed slightly lower than the actual upper (N→N+1) shift line (corresponding to Threshold2) can be preset. As a result, the shift prediction line is a reference speed at which the value is changed according to the torque similar to Threshold 2. Threshold 2 means the speed at which the actual shift occurs, while the shift prediction line means the speed at which shift is likely to occur in the near future based on the current required torque.

The use of the shift prediction line is based on the theory that, when the present operating point (determined by the vehicle speed and the required torque) reaches the shift prediction line, if the trend continues, there is a high possibility that the operating point reaches the actual upper shift line in the near future.

If it is determined that the engine is not started in step 840A but the shift occurs in step S840B, the hybrid controller 140 predicts whether the engine start will occur in the near future (S850B') based on the required torque and an engine start prediction line (required torque>=Threshold4?). The engine start prediction line will be described with reference to FIG. 10B. Referring to FIG. 10B, the engine start prediction line (corresponding to Threshold 4) having a required torque slightly lower than the engine start reference line (corresponding to Threshold 1) can be preset. The engine start prediction line is a reference torque line whose value is changed in accordance with the torque to at least one of the motor maximum torque, the battery available power, and the current SOC similar to Threshold 1. The Threshold 1 means a required torque invoking an actual engine start, while the engine start prediction line means a required torque at which the engine start is likely to occur in the near future based on the current required torque.

Operations (S860A to S860D) performed in accordance with each prediction are the same as those in FIG. 8, and overlapping description will be omitted.

In the above-described forms, the driver's acceleration/deceleration intention prediction model has been described as being constructed and modified through machine learning scheme of the driver's future intention corresponding to the current driving condition based on the data accumulated during actual driving of the vehicle. However, instead of using such prediction model, the predicted value of the near-future acceleration/deceleration intention may be determined by pre-establishing a rule. An example of such rule is shown in Table 1 below.

TABLE 1

| Input signal | Analysis of driving situation | Expected result |
|---|---|---|
| [Navi/Telematics]<br>Road type = Highway<br>Congestion information = Smooth<br>Front event = none<br>[Radar]<br>Front vehicle distance = Close<br>Front vehicle relative velocity = −10 kph<br>[Driving style/history]<br>Constant speed driving for the past 5 minutes<br>[Lane departure prevention system]<br>Maintain the current lane | Constant speed driving<br>Intermittent braking for<br>maintaining the distance<br>from the preceding vehicle | APS = 0,<br>BPS = Small |
| [Navi/Telematics]<br>Road type = Highway<br>Congestion information = Smooth<br>Front event = Tollgate/200 m<br>[Radar]<br>Front vehicle distance = none<br>Front vehicle relative speed = N/A<br>[Driving style/history]<br>Past toll pass average vehicle speed = 50 kph<br>[Lane departure prevention system]<br>Maintain the current lane | Highway driving<br>To go through the<br>tollgate, decrease<br>current speed to 50 kph | APS = 0,<br>BPS = Middle |

Further, although the future required torque has been described above as being predicted through near-future prediction, it may be replaced with an expected future acceleration value predicted by the acceleration/deceleration prediction module. Thereby, the second threshold value may also be set to an acceleration value instead of the required torque. As a result, when the current required torque is greater than or equal to the first threshold value and the predicted acceleration at a near-future point of time is greater than or equal to the second threshold value represented by an acceleration, downshifting may be performed, and if not, the current speed stage may be maintained.

The present disclosure described above may be implemented as a computer-readable code on a medium on which a program is recorded. The computer-readable medium includes all kinds of recording devices in which data that may be read by a computer system is stored. Examples of the computer-readable medium include a hard disk drive (HDD), a solid state drive (SSD), a silicon disk drive (SDD), a ROM, a RAM, a CD-ROM, a magnetic tape, a floppy disk, and an optical data storage device.

As apparent from the above description, the present disclosure has effects as follows.

A hybrid vehicle related to at least one form of the present disclosure configured as described above may more efficiently control the engine start.

Particularly, since the kinetic energy to be recovered at the time of shifting is directly used without passing through the battery, by controlling the shifting time point and the engine start time point within a predetermined range, thereby efficiency is improved.

It will be appreciated by those skilled in the art that the effects that can be achieved with the present disclosure are not limited to what has been described above and other effects of the present disclosure will be clearly understood from the following detailed description taken in conjunction with the accompanying drawings.

It will be apparent to those skilled in the art that various modifications and variations can be made in the present disclosure without departing from the spirit or scope of the present disclosures. Thus, it is intended that the present disclosure cover the modifications and variations of this present disclosure provided they come within the scope of the present disclosure.

What is claimed is:

1. A method of controlling a hybrid vehicle, the method comprising steps of:
   determining, by a hybrid controller, a first torque, which is a required torque at a current time;
   determining, by the hybrid controller, a second torque to be generated at a future time, or a predicted acceleration at the future time;
   determining, by the hybrid controller, a predicted speed at the future time based on a current speed and the second torque or the predicted acceleration;
   when one of an engine start condition or a shift condition is satisfied at the current time based on at least one of the first torque or the current speed, determining, by the hybrid controller, whether a remaining one of the engine start condition or the shift condition is satisfied at the future time; and
   when the remaining one is satisfied, controlling, by the hybrid controller, an event corresponding to a satisfied condition between the engine start condition or the shift condition at the current time to be delayed or an event corresponding to the satisfied condition at the future time to be advanced, wherein the event is a gear shift or an engine start, wherein the step of controlling comprises:
  performing a shift intervention control; and
  controlling at least a part of electric power recovered in the shift intervention control to be transferred, without charging a battery, to a starter/generator motor for an engine start, and
wherein an interval, during which a regeneration occurs due to a reverse torque applied to a motor, an inertia phase of a transmission, and a cranking interval of the starter/generator motor at least partially overlap each other.

2. The method according to claim 1, when the engine start condition is satisfied at the current time and the shift condition is satisfied at the future time,
  wherein the step of controlling comprises:
  delaying an engine start, or performing an early shift.

3. The method according to claim 1, wherein when the shift condition is satisfied at the current time and the engine start condition is satisfied at the future time,
  the step of controlling comprises:
  delaying a shift, or performing an early engine start.

4. The method according to claim 1, wherein the step of determining a first torque comprises:
  determining positions of an accelerator pedal and a brake pedal; and
  determining the first torque using the determined positions.

5. The method according to claim 1, wherein the step of determining a second torque or a predicted acceleration comprises:
  determining a predicted value of an acceleration/deceleration intention of a driver using an acceleration/deceleration prediction model having at least one of driver propensity information, advanced driver assistance system (ADAS) information, navigation information, or vehicle speed information as an input value; and
  determining the second torque or the predicted acceleration using the predicted value of the acceleration/deceleration intention.

6. The method according to claim 5, wherein the predicted value of the acceleration/deceleration intention comprises position information of an accelerator pedal and a brake pedal at the future time.

7. The method according to claim 1, wherein the engine start condition at the future time is satisfied when the second torque or the predicted acceleration is equal to or greater than a predetermined HEV mode transition torque.

8. The method according to claim 1, wherein the shift condition at the future time is satisfied when the predicted speed is equal to or greater than a shift occurrence reference speed that varies according to the second torque.

9. A method of controlling a hybrid vehicle, the method comprising steps of:
  determining, by a hybrid controller, whether an engine start condition is satisfied based on at least one of a vehicle speed, a battery charging state, an accelerator pedal position, a required torque, or a required power;
  predicting, by the hybrid controller, whether an upper shift condition is satisfied within a predetermined time from a current time, based on at least one of the vehicle speed, the battery charging state, the accelerator pedal position, the required torque, or the required power; and
  when the engine start condition is satisfied and the shift condition is predicted to be satisfied within the predetermined time during an EV mode driving, increasing engine speed due to an engine start and a decrease in the rotational speed of a motor due to an upper shift to be at least partially overlapped in time by delaying the engine start or by advancing the upper shift;
  performing a shift intervention control; and
  controlling at least a part of electric power recovered in the shift intervention control to be transferred, without charging a battery, to a starter/generator motor for an engine start,
wherein an interval, during which a regeneration occurs due to a reverse torque applied to the motor, an inertia phase of a transmission, and a cranking interval of the starter/generator motor at least partially overlap each other.

10. A hybrid vehicle comprising:
  a driving information detection system configured to interoperate with various sensors of the hybrid vehicle and configured to detect driving information of the hybrid vehicle;
  a driver acceleration/deceleration prediction processor configured to generate a predicted value of a future acceleration/deceleration intention of a driver reflecting a driving environment of the hybrid vehicle, based on information transmitted from the driving information detection system by utilizing an acceleration/deceleration prediction model; and
  a hybrid controller configured to:
    determine a first torque, which is a required torque at a current time,
    determine a second torque to be generated at a future time, or a predicted acceleration at the future time,
    determine a predicted speed at the future time based on a current speed and the second torque or the predicted acceleration,
    when it is determined that one of an engine start condition or a shift condition is satisfied at the current time based on at least one of the first torque or the current speed, determine whether a remaining one of the engine start condition or the shift condition is satisfied at the future time,
    when the remaining one is satisfied, control an event corresponding to a satisfied condition between the engine start condition or the shift condition at the current time to be delayed or an event corresponding to the satisfied condition at the future time to be advanced, wherein the event is a gear shift or an engine start,
    perform a shift intervention control, and
    control at least a part of electric power recovered in the shift intervention control to be transferred, without charging a battery, to a starter/generator motor for an engine start,
    wherein an interval, during which a regeneration occurs due to a reverse torque applied to a motor, an inertia phase of a transmission, and a cranking interval of the starter/generator motor at least partially overlap each other.

11. The hybrid vehicle according to claim 10, when the engine start condition is satisfied at the current time and the shift condition is satisfied at the future time,
  wherein the hybrid controller is further configured to delay an engine start, or perform an early shift.

12. The hybrid vehicle according to claim 10, when the shift condition is satisfied at the current time and the engine start condition is satisfied at the future time,
  wherein the hybrid controller is further configured to delay a shift, or perform an early engine start.

13. The hybrid vehicle according to claim 10, wherein the hybrid controller is further configured to determine the first torque by determining positions of an accelerator pedal and a brake pedal, and determining the first torque using the determined positions.

14. The hybrid vehicle according to claim 10, wherein the hybrid controller is further configured to determine the second torque by determining a predicted value of an acceleration/deceleration intention of a driver using an acceleration/deceleration prediction model having at least one of driver propensity information, advanced driver assistance system (ADAS) information, navigation information, or vehicle speed information as an input value, and determining the second torque or the predicted acceleration using the predicted value of the acceleration/deceleration intention.

15. The hybrid vehicle according to claim 14, wherein the predicted value of the acceleration/deceleration intention comprises position information on an accelerator pedal and a brake pedal at the future time.

16. The hybrid vehicle according to claim 10, wherein the engine start condition at the future time is satisfied when the second torque or the predicted acceleration is equal to or greater than a predetermined HEV mode transition torque.

17. The hybrid vehicle according to claim 10, wherein the shift condition at the future time is satisfied when the predicted speed is equal to or greater than a shift occurrence reference speed that varies according to the second torque.

18. The hybrid vehicle according to claim 1, wherein the shift intervention control is performed while changing transmission gears.

19. The hybrid vehicle according to claim 9, wherein the shift intervention control is performed while changing transmission gears.

20. The hybrid vehicle according to claim 10, wherein the shift intervention control is performed while changing transmission gears.

* * * * *